D. C. DAVIS.
FRICTION DRAFT AND BUFFING GEAR AND THE LIKE.
APPLICATION FILED SEPT. 27, 1919.
1,363,179.
Patented Dec. 21, 1920.
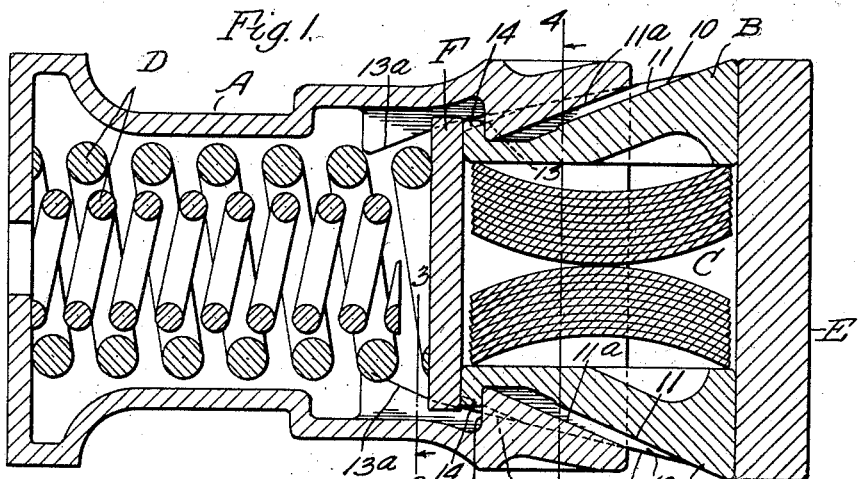
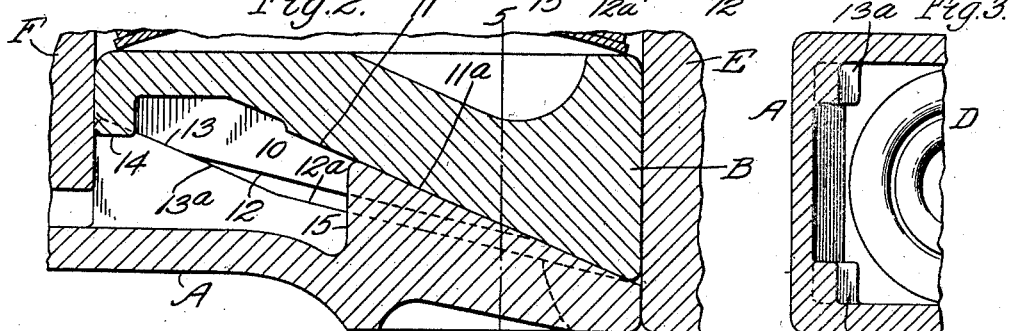
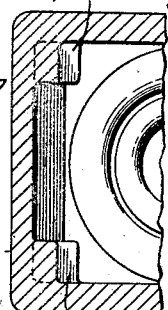
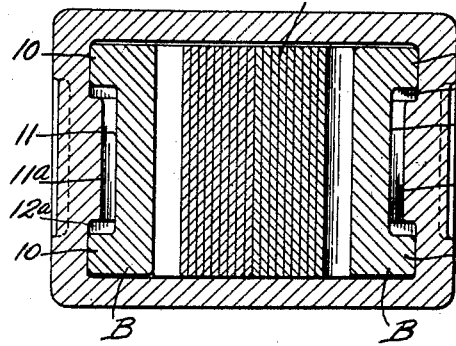
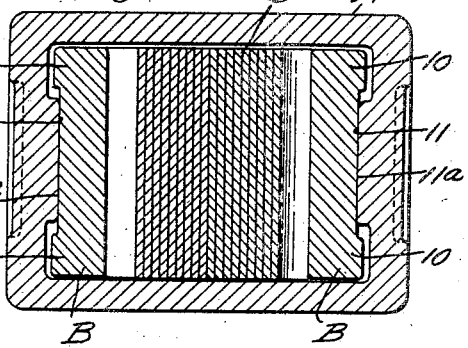
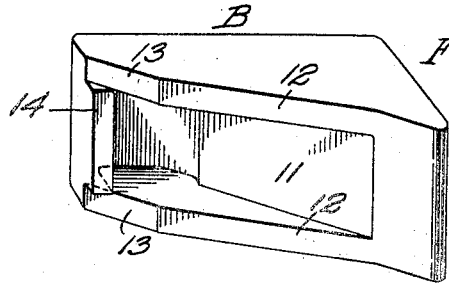
INVENTOR.
Donald C. Davis
By Parker & Rockwood
ATTORNEYS.

UNITED STATES PATENT OFFICE.

DONALD C. DAVIS, OF BUFFALO, NEW YORK, ASSIGNOR TO GOULD COUPLER COMPANY, OF NEW YORK, N. Y.

FRICTION DRAFT AND BUFFING GEAR AND THE LIKE.

1,363,179.      Specification of Letters Patent.      Patented Dec. 21, 1920.

Application filed September 27, 1919. Serial No. 326,761.

*To all whom it may concern:*

Be it known that I, DONALD C. DAVIS, a citizen of the United States, residing at Buffalo, in the county of Erie and State of New York, have invented a new and useful Improvement in Friction Draft and Buffing Gears and the like, of which the following is a specification.

This invention relates to frictional draft and buffing gears or resistance mechanisms of the sort that are used on railway cars and other railway rolling stock for yieldingly resisting draft and buffing strains.

Such friction gears usually comprise relatively movable friction elements having coöperating inclined faces which are pressed into contact by suitable springs or the like, whereby, when one of the elements is moved longitudinally relatively to the other, the inclined faces produce a lateral movement of one of the elements and strain said springs, thus increasing the friction between the elements and resisting the relative movement thereof. Bowed spring plates are commonly employed for producing the frictional pressure. In addition to these parts there is ordinarily provided also a coil release spring for restoring the elements to normal position after an operative movement thereof. The length of travel of the friction elements and the frictional capacity of the gear is dependent upon the inclination or pitch of the coöperating inclined friction faces and the strength or number of the pressure springs, but the possible variation in the inclination of these faces and the number of spring plates for pressing the friction faces together are limited by reason of the space allowed by the M. C. B. regulations for the draft and buffing gear. If the inclined friction faces have a low pitch, adapted to give a long travel for a given frictional resistance, the number of pressure springs which can be employed is limited because if too great a number is used the friction would be so great that the coil release spring would have to be of greater size and strength than is permissible in the space available for such spring. Greater frictional capacity can be obtained by using inclined friction faces of higher pitch but this shortens the travel of the friction elements and produces a resistance which increases so rapidly as to cause objectionable shocks in the operation of the gear.

The objects of this invention are to produce a frictional gear preferably adapted to resist both draft and buffing stresses, which enables a long travel of the actuating device with a resistance that increases slowly and gradually during a portion of the movement of the device and then increases more rapidly during another portion of the movement of the device and produces a high final resistance, thereby giving a gear having a high capacity and permitting a long travel of the actuating device and avoiding severe shocks; also to accomplish these results in a frictional gear or resistance mechanism which is of simple, strong and durable construction and does not require any greater number of parts than ordinarily used in friction draft and buffing gears having less capacity or a shorter travel; also to improve friction draft and buffing gears or frictional resistance mechanisms in the other respects hereinafter described and set forth in the claims.

In the accompanying drawings:

Figure 1 is a sectional plan view of a draft and buffing gear or frictional resistance mechanism embodying the invention.

Fig. 2 is a fragmentary sectional plan view thereof on an enlarged scale showing the position of the friction elements at the end of their operative movement.

Fig. 3 is a fragmentary transverse sectional elevation thereof on line 3—3, Fig. 1.

Fig. 4 is a transverse sectional elevation thereof on line 4—4, Fig. 1.

Fig. 5 is a transverse sectional elevation on the same scale as Fig. 4, but on line 5—5, Fig. 2, showing the final position of the friction elements.

Fig. 6 is a perspective view of one of the wedge blocks or friction elements detached.

The draft and buffing gear or frictional resistance mechanism preferably comprises, as usual, a barrel or casing A, which is open at one end, two oppositely arranged wedges or friction elements B which are adapted to move longitudinally in the open end of the barrel or casing and are provided with inclined friction faces adapted to slide against coöperating inclined friction faces in the barrel or casing, leaf springs or spring plates C which are arranged between the wedges B and press the same against the coöperating inclined faces in the barrel or casing, one or more coil release springs D arranged in the barrel or casing for moving the wedges B outwardly or in a direction to restore them to the normal position, a follower or device E adapted to engage the outer ends of the wedges for forcing them inwardly, and a follower or device F through which the release spring D acts upon the wedges to return them or move them outwardly. These parts, except with reference to the construction and arrangement of the wedges and coöperating friction faces or devices in the barrel or casing, may be of known or any suitable construction. As is well known, the mechanism is adapted to be arranged within the usual draw bar yoke, or otherwise connected to the actuating draft or buffing device so that when said device is moved in one direction it will push the follower E and force the wedges B into the barrel or casing, which is then held stationary by the usual stops, and when the draft or buffing device is moved in the opposite direction the barrel or casing A will be moved relatively to the wedges B, which are then held from longitudinal movement by the engagement of the follower E with the usual stops. The relative longitudinal movement of the wedges and barrel or casing, whether caused by moving the former or the latter, causes the wedges B to be moved laterally, or toward each other, against the resistance of the interposed pressure springs C.

Each of the wedges B and the coöperating friction element in the casing are provided with at least two sets of friction faces of different pitch or inclination arranged so that during one portion of the relative longitudinal movement of the wedge and barrel, one set of faces will act, and during another or succeeding portion of the movement another set of faces of different pitch or inclination will act. In the preferred construction shown in the drawings, each wedge B is provided with flanges or ribs 10 at its opposite or top and bottom sides, and with an inclined friction face 11 between these flanges or ribs. The edges 12 of the flanges 10 for a portion of their length are inclined at a lower pitch or inclination than the face 11, see Fig. 2, and the remaining, or inner end portions 13, of the edges are preferably inclined at the same pitch or inclination as the inclined face 11. Within the barrel or casing at its top and bottom, or opposite sides, are provided inclined friction faces 12$^a$ of the same inclination as and adapted to contact with the inclined edges 12 of the flanges of the wedges, and between these inclined faces are inclined faces 11$^a$ which have the same inclination as and are adapted to contact with the inclined faces 11 of the wedges. In the barrel or casing are also provided, at the inner ends of its friction faces 12$^a$, additional inclined faces 13$^a$ which are of the same pitch as and are adapted to contact with the portions 13 of the edges of the flanges of the wedges. In the initial or outer position of the wedges shown in Figs. 1 and 4, the inclined edges 12 of the flanges of the wedges contact with the coöperating faces 12$^a$ in the barrel or casing and the inclined faces 11 and 13 of the wedges are out of contact with the coöperating faces 11$^a$ and 13$^a$ in the barrel or casing. During an initial portion of inward movement of the wedges therefore, they will be forced laterally against the resistance of the spring C by the engagement of the faces 12 and 12$^a$ and owing to the low pitch of these faces the lateral movement of the wedges will be relatively small. After such initial movement of the wedges their inclined faces 11 and 13 will come into contact with the coöperating faces 11$^a$ and 13$^a$ respectively in the barrel or casing, and owing to the greater pitch or inclination of these faces, the wedges will be moved laterally more abruptly or rapidly, the contact of the faces 11 and 13 with the faces 11$^a$ and 13$^a$ moving the faces 12 of the wedges out of contact with the coöperating faces 12$^a$ in the barrel or casing. Thus, during a portion of the longitudinal movement of the wedges they will be moved laterally and cause a partial compression of the springs C, and during the further longitudinal movement of the wedges they will be moved laterally more abruptly or rapidly and produce a consequent higher frictional resistance. During the first portion of the return movement of the wedges to their initial position the contacting faces 11—11$^a$ and 13—13$^a$ do not offer very great resistance to the release of the wedges because of their relatively great pitch, and during the remaining portion of the release or return movement of the wedges the contacting faces 12 and 12$^a$ do not offer great resistance to the release of the wedges because at this time the pressure of the faces against each other by the springs C has been greatly reduced. Therefore, comparatively light coil springs D can be employed for releasing the wedges and the sudden and violent recoil of the wedges is prevented.

The wedges are preferably provided at their inner ends with transverse outwardly projecting stops or flanges 14 which are adapted to contact with stops or shoulders 15 in the barrel or casing at the inner ends of the inclined faces 11$^a$. The flanges 14 and shoulders 15 constitute stops to limit the outward movement of the wedges and prevent the displacement of the parts of the mechanism from the barrel or casing. The flanges or ribs 10 and 14 of the wedges materially strengthen and stiffen the wedges and the flanges 10 also act as guides for the wedges during the initial movement of the same relatively to the barrel. Since the edges 12 of the flanges 10 bear against the coöperating inclined faces 12ª for a considerable portion of the length of the wedges between the ends thereof, the wedges are prevented from rocking or tipping out of their intended parallel relation. On the other hand, during the last portion of the inward movement of the wedges relatively to the barrel the contact of the faces 11 and 13 of the wedges with the faces 11ª and 13ª of the barrel at points adjacent to the opposite ends of the wedges acts similarly to prevent the wedges from rocking or tipping out of their intended parallel relation.

While it is preferable to provide the inclined faces having the different inclinations both on the wedges and in the casing, as described, because of the larger contacting areas of the coöperating friction elements thus obtained, it will be evident that a similar two stage action of the mechanism would be secured if the inclined faces were provided only on one of the elements and contacted with parts of other shape on the coöperating element. Such different arrangements are contemplated in the claims. Furthermore, the invention is not restricted to a construction in which the friction elements with which the wedges contact are formed in a barrel or casing.

I claim as my invention:

1. In a frictional resistance mechanism, the combination of a casing and a wedge therein, one of which is movable longitudinally relative to the other, said wedge having an inclined face and flanges at opposite sides of said inclined face provided with inclined edges of a different inclination from said inclined face, and faces in said casing arranged to contact respectively with said inclined face and inclined flange edges of the wedge, whereby the wedge is moved laterally, and a spring which forces said wedge against said faces in the casing and resists lateral movement of the wedge.

2. In a frictional resistance mechanism, the combination of a casing and a wedge therein, one of which is movable longitudinally relatively to the other, said wedge having an inclined face and flanges at opposite sides of said inclined face provided with inclined edges, a portion of each of said inclined edges having the same inclination as said face, and other portions of said edges having different inclinations, and faces in said casing arranged to contact respectively with said inclined face and the different portions of the inclined flange edges of the wedge, whereby the wedge is moved laterally, and a spring which forces said wedge against said faces in the casing and resists lateral movement of the wedge.

3. In a frictional resistance mechanism, the combination of coöperating friction elements one of which is movable longitudinally relatively to the other, inclined faces on said elements that contact during one portion of said relative longitudinal movement, and a pair of parallel inclined friction faces on each of said elements, the pair of inclined faces on one of said elements contacting with the pair of inclined faces on the other of said elements during a succeeding portion of said relative longitudinal movement, whereby one of said elements is moved laterally, and means for yieldingly resisting said lateral movement.

4. In a frictional resistance mechanism, the combination of coöperating friction elements one of which is movable longitudinally relatively to the other, inclined faces on said elements that contact during one portion of said relative longitudinal movement, and a pair of parallel inclined friction faces on each of said elements, the pair of inclined faces on one of said elements contacting with the pair of inclined faces on the other of said elements during a succeeding portion of said relative longitudinal movement, said parallel friction faces being of different inclination than said first named faces.

5. In a frictional resistance mechanism, the combination of coöperating friction elements one of which is movable longitudinally relatively to the other, one of said elements having an inner inclined face and an outer flange, said flange having an inclined edge, the inclinations of said face and said edge being different, and inclined faces on the other of said elements for contacting with the inclined faces of said first element.

6. In a frictional resistance mechanism, the combination of coöperating friction elements, one of which is movable longitudinally relatively to the other, one of said elements having a pair of inclined faces of the same pitch and an inclined face of different pitch between said pair of faces, and the other of said elements having inclined faces to contact with the faces of said first named element during relative longitudinal movement whereby one of said elements is moved laterally, and means for yieldingly resisting said lateral movement.

7. In a frictional resistance mechanism, the combination of a friction element having an inclined face, a second inclined face on said element, said second face being of different pitch and projecting beyond said first face, a second friction element having faces of different inclination, one of said friction elements being movable longitudinally relatively to the other, the faces of one of said friction elements contacting with the faces of the other of said friction elements during longitudinal movement to move one of said elements laterally, and means for yieldingly resisting said lateral movement.

8. In a frictional resistance mechanism the combination of a casing and a wedge therein, one of which is movable longitudinally relatively to the other, said wedge having an inclined face and flanges at opposite sides of said inclined face, each of said flanges having inclined edges, a portion of each of said edges being of the same inclination as said face, the remaining portion of each of said edges being of different inclination, and faces in said casing arranged to contact respectively with said inclined face and the different portions of the inclined flange edges of the wedge, whereby the wedge is moved laterally, and a spring which forces said wedge against said faces in the casing and resists lateral movement of the wedge.

9. In a frictional resistance mechanism, the combination of a casing and a wedge therein, one of which is movable relatively to the other, said wedge having an inclined face and flanges at opposite sides of said inclined face provided with inclined edges of a different inclination from said inclined face, a face in said casing of the same inclination as said wedge face and arranged to contact therewith, faces at opposite sides of said casing face arranged to contact with said flange edges, whereby the wedge is moved laterally, and a spring which forces said wedge against the faces in the casing and resists lateral movement of the wedge.

10. In a frictional resistance mechanism, the combination of a casing and a wedge therein, one of which is movable relatively to the other, said wedge having an inclined face and flanges at opposite sides of said inclined face provided with inclined edges, said edges having portions which are of a different inclination from said inclined face and portions of the same inclination as said face, a face in said casing of the same inclination as said wedge face and arranged to contact therewith, faces at opposite sides of said casing face arranged to contact with said flange edges, whereby the wedge is moved laterally, and a spring which forces said wedge against the faces in the casing and resists lateral movement of the wedge.

Witness my hand this 22nd day of September, 1919.

DONALD C. DAVIS.

Witnesses:
ALLEN B. BRIMMER,
GEO. E. HAMMOND.